United States Patent [19]

Imai et al.

[11] Patent Number: 5,021,292

[45] Date of Patent: Jun. 4, 1991

[54] MAGNETIC RECORDING MEDIUM AND MAGNETIC COATING COMPOSITION THEREFOR

[75] Inventors: Kyoiti Imai; Tateo Ishida, both of Fukui, Japan

[73] Assignee: Nissin Chemical Industry Co., Ltd., Fukui, Japan

[21] Appl. No.: 281,054

[22] Filed: Dec. 8, 1988

[30] Foreign Application Priority Data

Dec. 9, 1987 [JP] Japan ............................... 62-311761

[51] Int. Cl.[5] ............................................ G11B 23/00

[52] U.S. Cl. .................................. 428/323; 428/329; 428/694; 428/900

[58] Field of Search .............. 428/694, 900, 329, 323; 252/62.51

[56] References Cited

U.S. PATENT DOCUMENTS

| | | | |
|---|---|---|---|
| 4,571,364 | 2/1986 | Kasuga et al. | 428/694 |
| 4,594,174 | 6/1986 | Nakayama et al. | 428/694 |
| 4,603,081 | 7/1986 | Shimada et al. | 428/694 |
| 4,601,947 | 7/1986 | Shimada et al. | 428/694 |
| 4,743,501 | 5/1988 | Eguchi et al. | 428/694 |
| 4,748,084 | 5/1988 | Hata et al. | 428/694 |
| 4,784,914 | 11/1988 | Matsufuji et al. | 428/694 |

OTHER PUBLICATIONS

Abstract of Japan Patent Publication 63-16415 Published Jan. 23, 1988.

Abstract of Japan Patent Publication 63-16416 Published Jan. 23, 1988.

Abstract of Japan Patent Publication 63-16417 Published Jan. 23, 1988.

Abstract of Japan Patent Publication 61-89207 Published May 7, 1986.

Abstract of Japan Patent Publications 61-123017 Published Jun. 10, 1986.

Abstract of Japan Patent Publication 62-26630 Published Feb. 4, 1987.

Abstract of Japan Patent Publication 62∝112217 Publishsed May 23, 1987.

Abstract of Japan Patent Publication 62-175928 Published Aug. 1, 1987.

Abstract of Japan Patentr Publication 62-208422 Published Sep. 12, 1987.

Abstract of Japan Patent Publication 60-101161 Published Jun. 5, 1985.

Abstract of Japan Patent Publication 60-235814 Published Nov. 22, 1985.

Abstract of Japan Patent Publication 60-238306 Published Nov. 27, 1985.

Abstract of Japan Patent Publication 60-238309 Published Nov. 27, 1985.

Abstract of Japan Patent Publication 60-238371 Published Nov. 27, 1985.

Abstract of Japan Patent Publication 61-53367 Published Mar. 17, 1986.

*Primary Examiner*—Paul J. Thibodeau

*Attorney, Agent, or Firm*—Wenderoth, Lind & Ponack

[57] ABSTRACT

The magnetic coating composition of the invention comprises ferromagnetic particles having a specific surface area of at least 35 $m^2/g$ dispersed in a resinous vehicle which is a polyvinyl chloride-based copolymeric resin composed of five types of monomeric moieties including (a) a moiety of vinyl chloride, (b) a moiety of vinyl alcohol, (c) a moiety of a vinyl carboxylate having from 6 to 20 carbon atoms in a unit, (d) a moiety of a vinyl or allyl monomer having a sul-fonic acid group or a sulfonic acid group in the form of a metal salt in the molecule, and (e) a moiety of a vinyl or allyl monomer having an epoxy group in the molecule. This vehicle resin is advantageous in respect of the dispersibility of the ferromagnetic particles to greatly facilitate the coating operation due to the relatively low viscosity of the coating composition as compared with conventional resins.

10 Claims, No Drawings

MAGNETIC RECORDING MEDIUM AND MAGNETIC COATING COMPOSITION THEREFOR

BACKGROUND OF THE INVENTION

The present invention relates to a magnetic recording medium or, more particularly, to a magnetic recording medium in which the magnetic coating layer on a substrate is formed by using a specific resinous binder capable of exhibiting excellent binding power for the ferromagnetic particles dispersed as well as a magnetic coating composition therefor.

As is known, magnetic recording media such as magnetic recording tapes, floppy discs and the like are prepared usually by coating the surface of a substrate made of a plastic such as polyesters with a magnetic coating composition which is a dispersion of ferromagnetic particles in a synthetic resin as a binder or vehicle.

Examples of the ferromagnetic particles used in magnetic recording media include particles of iron oxide, e.g., $\gamma$-$Fe_2O_3$ and $Fe_3O_4$, optionally, doped with or adsorbing cobalt ions, chromium oxide $CrO_2$, and needle-like fine metallic particles of iron, cobalt, an alloy of iron and cobalt optionally containing nickel. Along with prevalence of household video tape recorders and the trend of cassetted audio tapes toward higher and higher performance in recent years, magnetic recording media are required to be compatible with the demand for an increased density of signal recording and higher playback output in short-wavelength recording. It is important in order to satisfy these requirements that the ferromagnetic particles have a finer particle size distribution and hence a greatly increased magnetic moment. This situation results in an increased difficulty in obtaining uniform distribution of the ferromagnetic particles in the resinous binder because the particles readily agglomerate as a consequence of the increased magnetic moment.

In view of the above described technical problems which could be solved by increasing the affinity between the ferromagnetic particles and the resinous binder, extensive investigations are now under way to impart the resin binder with hydrophilicity which is possessed by the ferromagnetic particles of a metallic oxide, metal or alloy.

For example, a proposal has been made to introduce hydrophilic functional groups such as carboxyl and hydroxy groups into a copolymer of vinyl chloride and vinyl acetate currently in practical use as a binder resin. Several scientific articles of "Magnetic tapes and high polymers" appearing in "Nippon Secchaku Kyokaishi" (Journal of Japanese Association of Adhesion), volume 17, No. 4 (1981), pages 155 to 162, are directed to the technical problem of introducing various kinds of hydrophilic groups into polymers as a binder in magnetic coating compositions used for magnetic recording media. According to one of the articles, several kinds of hydrophilic groups are rated in a decreasing order as shown below relative to the types of anchor segments and the effectiveness thereof:

$$—SO_3H > —COOH > —OH > —N= > \text{(epoxy)} > —CN.$$

Effectiveness of the sulfonic acid groups $—SO_3H$ introduced into a binder resin is also known from Japanese Patent Kokai No. 58-108032, according to which examples of suitable resins as a binder of ferromagnetic particles include copolymers obtained by the copolymerization of a monomer such as a vinyl carboxylate, vinyl chloride, vinylidene chloride, acrylonitrile, styrene and the like and a polymerizable unsaturated sulfonic acid such as vinyl sulfonic acid, vinylbenzene sulfonic acid, 2-acrylamide-2-methyl propane sulfonic acid and the like.

Although a remarkable improvement can indeed be obtained in the dispersibility of ferromagnetic particles by the introduction of sulfonic acid groups, for example, into a copolymer of vinyl chloride and a vinyl carboxylate, this means is not always quite satisfactory in respect of the relatively poor surface gloss of the magnetic recording media prepared from a modern high-performance ferromagnetic powder with such a resin as a binder, as well as a noticeable decrease of the saturation magnetization of the magnetic recording media with the lapse of time. The effectiveness of introduction of carboxyl and hydroxy groups into a binder resin is insufficient in respect of the desired improvement of dispersibility of the ferromagnetic particles.

Japanese Patent Kokai No. 57-44227 proposes a binder resin which is a copolymer composed of vinyl chloride moiety, vinyl acetate moiety and vinyl alcohol moiety with the hydroxy group of the vinyl alcohol moiety modified with a hydrophilic group such as $—SO_3M$, $—OSO_3M$ and the like, M being an atom of metal. An improvement is indeed obtained with the binder resin of this type relative to the dispersibility of the ferromagnetic particles and dusting but the resin is liable to cause dehydrochlorination reaction so that it is disadvantageous in respect of the stability or long-term durability. In particular, the resin is responsible for the degradation of the magnetic properties such as the density of residual magnetic flux with the lapse of time when the ferromagnetic particulate material is formed of an alloy such as those of iron and cobalt. The reason for this very serious defect of the resin is presumably that degradation of the polymer takes place in the course of the manufacturing process of the resin which is performed under severe reaction conditions such that the hydroxy groups in the starting polymer, which is a vinyl chloride-based polymer having hydroxy groups introduced thereinto, are modified by the reaction with a chlorine-containing sulfonic acid in the form of a metal salt followed by the introduction of a sulfonic acid group in the form of a metal salt.

In view of the above described problems, the inventors have previously proposed an improved magnetic recording medium in Japanese Patent Kokai No. 61-39927, which is prepared by providing a substrate with a magnetic coating layer of a coating composition containing ferromagnetic particles dispersed in a copolymeric binder resin composed of (1) vinyl chloride moiety, (2) vinyl alcohol moiety, (3) vinyl carboxylate moiety having 8 to 16 carbon atoms in a unit and (4) moiety of polymerizable unsaturated sulfonic acid optionally or at least partly in the form of a metal salt. The resin of this type is indeed very superior to the conventional ones but still has a problem, especially, when the ferromagnetic particles dispersed therein have a very fine particle size distribution, for example, with a specific surface area of 35 $m^2/g$ or larger as determined by the BET method, although the magnetic recording medium prepared therefrom has good surface properties. Namely, the magnetic coating composition prepared by compounding the resin and such a fine ferromagnetic powder may have an unduly high consistency as a consequence of the poor dispersibility and impregnation performance of the particles in the resinous vehicle so that difficulties are encountered during coating of the substrate surfaces using the coating composition to form a fully uniform coating layer at a high velocity. Although a possibility of high-velocity coating can be obtained by using a resin having a decreased degree of polymerization to give a coating composition of lower consistency, the magnetic coating layer formed by using such a low-molecular resin as the binder is somewhat fragile so that the durability of the magnetic recording medium is unavoidably decreased.

SUMMARY OF THE INVENTION

The present invention accordingly has an object to provide an improved magnetic recording medium free from the above described problems and disadvantages in the magnetic recording media of the prior art, as well as a magnetic coating composition used in the preparation of the magnetic coating medium. In particular, the invention has an object to provide a magnetic recording medium, of which (i) a very fine metallic ferromagnetic powder can be easily and uniformly dispersed in the magnetic coating layer irrespective of the specific surface area which may be as large as, for example, 35 $m^2/g$ or larger so that the ferromagnetic particles may have a good orientation behavior in a magnetic field, (ii) the magnetic coating layer can be loaded with an increased volume of the ferromagnetic particles, (iii) the surface of the magnetic coating layer has high smoothness, and (iv) the magnetic coating layer has superior mechanical properties to exhibit high durability in the repeated recording and playback without any mechanical damage due to contact with the magnetic head.

The magnetic recording medium of the present invention comprises:

a substrate; and a magnetic coating layer, formed on at least one surface of the substrate, of a magnetic coating composition comprising, in admixture, (A) a vinyl chloride-based copolymeric resin as a resinous vehicle, and (B) ferromagnetic particles having a specific surface area of at least 35 $m^2/g$ as determined by the BET method dispersed in the vehicle of the copolymeric resin, the copolymeric resin being composed of (a) a moiety of vinyl chloride, (b) a moiety of vinyl alcohol, (c) a moiety of a vinyl carboxylate having from 6 to 20 carbon atoms in a vinyl carboxylate unit, (d) a moiety of a vinyl or allyl monomer having a sulfonic acid group or a sulfonic acid group in the form of a metal salt in the molecule, and (e) a moiety of a vinyl or allyl monomer having an epoxy group in the molecule.

In particular, it is preferable that the vinyl chloride-based copolymeric resin has an average degree of polymerization in the range from 200 to 800 and is composed of from 60 to 92% by weight of the moiety (a), from 3 to 15% by weight of the moiety (b), from 3 to 25% by weight of the moiety (c), from 0.5 to 3% by weight of the moiety (d) and from 1 to 10% by weight of the moiety (e).

DETAILED DESCRIPTION OF THE PREFERRED EMBODIMENTS

As is described above, the most characteristic feature of the inventive magnetic recording medium is in the use of a very specific vinyl chloride-based copolymeric resin as a binder or a vehicle of the very fine ferromagnetic particles. The copolymeric resin is characteristically composed of five types of moieties derived from different monomers described above as (a) to (e).

The moiety (a) is a moiety of vinyl chloride introduced by the copolymerization of vinyl chloride. The weight fraction of this vinyl chloride moiety in the copolymeric resin is preferably in the range from 60 to 92%. When the weight fraction of the moiety (a) is too small, the magnetic coating layer formed from the coating composition may have somewhat decreased mechanical strength. When the weight fraction thereof is too large, the solubility of the copolymeric resin is decreased so that a difficulty is encountered in the preparation of the magnetic coating composition by dissolving the resin in a solvent and the coating operation therewith.

The moiety (b) is a moiety of vinyl alcohol which can be introduced into the copolymer by first preparing a copolymer including vinyl acetate moiety and then saponifying the acetoxy groups in the vinyl acetate moiety. The weight fraction of this moiety in the copolymeric resin is preferably in the range from 3 to 15%. When the weight fraction thereof is too small, the dispersibility of the ferromagnetic particles in the vehicle resin is decreased. When the magnetic coating composition is compounded, as is described later, with a polyurethane resin and the like as an optional additive, the vinyl chloride-based copolymeric resin with a low weight fraction of the vinyl alcohol moiety may have a decreased compatibility with the additive resin. When the magnetic coating composition is compounded with an isocyanate prepolymer as an optional additive, the reactivity of the vinyl chloride-based copolymeric resin with a low weight fraction of the vinyl alcohol moiety with the isocyanate prepolymer is decreased so that the gel fraction in the cured magnetic coating layer cannot be sufficiently high to cause a decrease in the durability of the magnetic coating layer. When the weight fraction thereof is too large, on the other hand, a decrease is caused in the mechanical strength and thermal stability of the magnetic coating layer to affect the durability of the magnetic recording medium such as for use in magnetic tapes.

The third moiety in the copolymeric resin is introduced by the copolymerization of a vinyl carboxylate represented by the general formula $CH_2{=}CH{-}O{-}CO{-}R$, in which R is an alkyl group having 3 to 17 carbon atoms to give a total number of the carbon atoms of 6 to 20 in a molecule. It is a quite unexpected discovery that a vinyl chloride-based copolymeric resin having a vinyl carboxylate moiety gives a solution having a relatively low viscosity suitable for the coating operation and improves the dispersibility and impregnation behavior of the ferromagnetic particles in the vehicle resin only when the vinyl carboxylate comonomer has the above mentioned number of carbon atoms in a molecule. In contrast thereto, a vinyl carboxylate having 5 or smaller number of carbon atoms in a molecule, e.g., vinyl propionate, has no effect of improvement of the dispersibility and impregnation behavior of the ferromagnetic particles in the vehicle resin and, in addition, decreases the stability of the copolymeric resin at an elevated temperature since the vinyl carboxylate moiety is liable to splitting of the carboxylate groups to form a carboxylic acid to accelerate thermal decomposition of the vinyl chloride moiety resulting in a decrease in the durability and magnetic characteristics of the magnetic recording medium. When the vinyl carboxylate has a larger number of carbon atoms than 20 in a molecule, the copolymeric resin may have a decreased solubility in organic solvents resulting in poor dispersibility of the ferromagnetic particles. Examples of preferable vinyl carboxylate include those having 8 to 14 carbon atoms in a molecule such as vinyl caproate, vinyl caprylate, vinyl caprate and vinyl laurate. Vinyl esters of certain carboxylic acids having a branched molecular structure, such as those sold under the tradenames of Versatic Acids, are available under the tradenames of Veova #9, Veova #10 and Veova #11 having 11, 12 and 13 carbon atoms, respectively, in a molecule and are also suitable for the invention. These vinyl carboxylates can be used either singly or as a combination of two kinds or more according to need. The weight fraction of the moiety (c) in the copolymeric resin is in the range from 3 to 25%. When the weight fraction of the moiety is in this range, the magnetic coating composition may have excellent properties in respect of good solubility of the resin in organic solvents, low viscosity of the coating composition and high mechanical strength of the magnetic coating layer as well as improved dispersibility and impregnation behavior of the ferromagnetic particles.

The fourth moiety (d) in the copolymeric resin is derived from a vinyl or allyl monomer having a sulfonic acid group $—SO_3H$ or a sulfonic acid group in the form of a metal salt in the molecule. Examples of suitable monomers of this type include those expressed by the following formulas: $CH_2{=}CH—SO_3X$; $CH_2{=}CH—CH_2—SO_3X$;

$CH_2{=}CH—C_6H_4—SO_3X$; $CH_2{=}CCH_3—CH_2—SO_3X$;

$CH_2{=}CH—CO—NH—C(CH_3)_2—CH_2—SO_3X$;

$CH_2{=}CH—CO—O—C_4H_8—SO_3X$;

$CH_2{=}CH—CH_2—O—CO—CH(CH_2—CO—O—R')—SO_3X$;

$CH_2{=}CCH_3—CO—O—C_2H_4—SO_3X$ and the like, in which X is a hydrogen atom or an atom of an alkali metal such as lithium, sodium and potassium and R' is an alkyl group having 8 to 16 or, preferably, 12 to 14 carbon atoms. The weight fraction of the moiety (d) in the copolymeric resin is in the range from 0.5 to 3%. When the weight fraction of this moiety is outside of this range, the dispersibility of the ferromagnetic particles in the magnetic coating composition is decreased.

The fifth moiety (e) in the copolymeric resin is derived from a vinyl monomer or allyl monomer having an epoxy group in a molecule. Examples of suitable epoxy-containing monomers include glycidyl methacrylate, glycidyl acrylate, glycidyl crotonate, 2-methyl glycidyl methacrylate, diglycidyl fumarate, allyl glycidyl ether, methallyl glycidyl ether, allyl 2-methyl glycidyl ether and the like. These epoxy-containing monomers can be used either singly or as a combination of two kinds or more. The weight fraction of the epoxy-containing moiety (e) in the copolymeric resin is in the range from 1 to 10%. When the weight fraction thereof is too small, no improvement can be obtained in the thermal stability of the resultant magnetic recording medium. When the weight fraction is too large, the dispersibility of the ferromagnetic particles in the magnetic coating composition is decreased.

The vinyl chloride-based copolymeric resin composed of the above described five types of the moieties should have an average degree of polymerization in the range from 200 to 800 or, preferably, from 300 to 500. When the average degree of polymerization of the copolymeric resin is too small, the magnetic coating layer may have poor mechanical properties so that the durability of the magnetic recording medium is decreased. When the average degree of polymerization of the copolymeric resin is too large, on the other hand, the magnetic coating composition compounded with the resin may have an unduly increased viscosity or consistency to greatly affect the working efficiency with the coating composition. The average degree of polymerization here implied is a value obtained by measuring the viscosity of a nitrobenzene solution of the resin and performing the calculation according to the equation giving a relation between the solution viscosity and average degree of polymerization of a polyvinyl chloride resin specified in JIS.

The vinyl chloride-based copolymeric resin can be prepared by copolymerizing five types of comonomers according to a known procedure of suspension polymerization, emulsion polymerization, solution polymerization, bulk polymerization and the like. The moiety of vinyl alcohol (b) can be introduced into the copolymer by copolymerizing a vinyl lower-carboxylate such as vinyl acetate and vinyl propionate or, preferably, vinyl acetate as one of the comonomers together with the other comonomers and saponifying the thus obtained copolymer containing the units of vinyl acetate and the like using an alkali such as potassium hydroxide, sodium hydroxide, sodium alcoholate and the like or an acid such as hydrochloric acid as a catalyst. It is preferable that the saponification reaction is as complete as possible not to leave unsaponified units of vinyl acetate or vinyl propionate. When the saponification reaction is undertaken under adequately controlled conditions, the moiety (c) derived from the vinyl carboxylate having 6 to 20 carbon atoms in a molecule is left unsaponified.

It is not always necessary that the above described vinyl chloride-based copolymeric resin alone is used as the binder or vehicle resin of the magnetic coating composition but it is optional according to need that one or more of other conventional polymeric resins are used in combination therewith in an amount not to exceed the amount of the vinyl chloride-based copolymeric resin. Examples of suitable auxiliary resins include polyurethanes, nitrocelluloses, epoxy resins, polyamide resins and phenolic resins as well as polymers or copolymers of the monomer or monomers selected from the group consisting of esters of acrylic or methacrylic acid, styrene, acrylonitrile, butadiene, ethylene, propylene, vinylidene chloride, acrylamide, alkyl vinyl ethers and the like, of which polyurethanes and nitrocelluloses are particularly preferred.

It is also preferable that the magnetic coating composition is compounded with a polyisocyanate-based curing agent in combination with the vinyl chloride-based copolymeric resin. Examples of such a polyisocyanate-based curing agent include difunctional isocyanate compounds such as tolylene diisocyanates, diphenyl methane diisocyanates, hexane diisocyanates and the like, trifunctional isocyanate compounds sold under the tradenames of Coronate L (a tradename by Nippon Polyurethane Kogyo Co.), Desmodur L (a tradename by Bayer Co.) and the like and urethane prepolymers having isocyanate groups at both molecular chain ends. The amount of these polyisocyanate-based curing agents in the magnetic coating composition should not exceed 40 parts by weight per 100 parts by weight of the vinyl chloride-based copolymeric resin as the binder of the ferromagnetic particles.

The ferromagnetic particles dispersed in the magnetic coating composition of the invention should be so fine as to have a specific surface area of at least 35 $m^2/g$ or, preferably, in the range from 45 to 55 $m^2/g$ as determined by the BET method. Examples of the ferromagnetic powder include iron oxide, e.g., $\gamma$-$Fe_2O_3$ and $Fe_3O_4$, optionally, doped with or adsorbing cobalt ions, chromium oxide, $CrO_2$, and needle-like fine metallic particles of iron, cobalt, an alloy of iron and cobalt optionally containing nickel though not particularly limited thereto. It is preferable that the magnetic coating composition of the invention is compounded with 8 to 30 parts by weight of the vinyl chloride-based copolymeric resin as the vehicle per 100 parts by weight of the ferromagnetic particles.

It is of course optional that the magnetic coating composition of the invention is prepared with admixture of various kinds of known additives such as lubricants, abrasive powders, antistatic agents, dispersion aids, rust inhibitors and the like according to need. The magnetic coating composition is prepared by dissolving or dispersing the ferromagnetic particles, vehicle resin and optional additives in a suitable organic solvent such as methyl ethyl ketone, methyl isobutyl ketone, toluene and the like to have a consistency suitable for the coating operation.

The magnetic recording medium of the present invention is prepared by coating at least one surface of a substrate with the above described magnetic coating composition followed by drying. Examples of the substrate bodies include films, sheets, tapes, plates and the like made from various kinds of synthetic resins such as polyesters, polyolefins, cellulose acetates, polycarbonates and the like, non-magnetic metals, ceramics and so on without particular limitations. The coating operation can be performed by any known method. If desired, the coated and dried surface is subjected to a treatment for increasing the smoothness of the surface, for example, by calendering to give the finished product of the magnetic recording medium.

In the following, the present invention is described in more detail by way of examples as preceded by a description of the preparation procedure of the vinyl chloride-based copolymeric resins used as a binder or vehicle resin in the invention. In the description below, the terms of "parts" and "%" each refer always to "parts by weight" and "% by weight", respectively.

EXAMPLE 1

Into an autoclave with a stirrer equipment after flushing with nitrogen gas, were introduced 982 g of vinyl chloride, 200 g of vinyl acetate, 80 g of vinyl butyrate, 53 g of allyl glycidyl ether, 67 g of a 30% aqueous solution of sodium vinyl sulfonate, 2000 g of deionized water, 23 g of sodium lauryl sulfate (Emal O, a product by Kao Co.), 46 g of polyoxyethylene octylphenyl ether (Octapol #400, a product by San-yo Kasei Co.), 24 g of trichloroethylene, 6 g of sodium carbonate and 24 g of potassium persulfate to form a polymerization mixture which was heated up to a temperature of 60° C. under agitation to start the coplymerization reaction. After 7 hours of continued reaction of the same temperature when the inside pressure of the autoclave had dropped to 0.5 $kg/cm^2$ G, the unreacted gaseous monomer was purged and the polymerization mixture was cooled to room temperature. The thus obtained polymerization mixture in the form of an aqueous emulsion was admixed with 3500 g of methyl alcohol and further agitated for 1 hour at 60° C. followed by cooling to room temperature. The slurry of copolymer in the aqueous methyl alcohol was filtered to collect the particles of the copolymeric resin which was washed three times each with 3500 g of deionized water followed by drying to give 1116 g of the copolymeric resin in the form of a powder. Analysis of this copolymeric resin indicated that the resin was composed of 79.2% of the vinyl chloride units, 12.8% of the vinyl acetate units, 4.8% of the vinyl butyrate units, 2.7% of the allyl glycidyl ether units and 0.5% of the sodium vinyl sulfonate units. The copolymeric resin had an average degree of polymerization of 360.

Thereafter, 500 g of the copolymeric resin were taken in a reaction vessel equipped with a reflux condenser together with 700 g of methyl alcohol, 300 g of acetone and 20 g of sodium hydroxide and the mixture was heated at 50° C. for 5 hours to effect saponification of the copolymeric resin. After cooling to room temperature, 25 g of acetic acid were added to the mixture to neutralize the unreacted sodium hydroxide. The copolymeric resin in the reaction mixture was first washed four times each with 1000 g of methyl alcohol and then washed twice each with 1000 g of deionized water by decantation followed by filtration and drying to give 440 g of a saponified copolymeric resin which is referred to as Polymer I hereinbelow, having an average degree of polymerization of 350. Analysis of this Polymer I indicated that the resin was composed of 84.5% of the vinyl chloride units, 6.9% of the vinyl alcohol units, 0.1% of the vinyl acetate units, 5.1% of the vinyl butyrate units, 2.9% of the allyl glycidyl ether units and 0.5% of the sodium vinyl sulfonate units.

EXAMPLE 2

Into an autoclave equipped with a stirrer, after flushing with nitrogen gas, were introduced 477 g of vinyl chloride, 178 g of vinyl acetate, 221 g of vinyl caprate, 69 g of allyl glycidyl ether, 52 g of sodium methallyl sulfonate, 2160 g of deionized water, 24 g of sodium lauryl sulfate (Emal O, supra), 48 g of polyoxyethylene octylphenyl ether (Octapol #400, supra), 24 g of trichloroethylene, 6 g of sodium carbonate and 24 g of potassium persulfate to form a polymerization mixture which was heated up to a temperature of 60° C. under agitation to start the copolymerization reaction. During proceeding of the polymerization reaction, 477 g of vinyl chloride monomer were additionally introduced continuously into the autoclave under pressurization taking 8 hours.

When the inside pressure of the autoclave had dropped to 0.5 $kg/cm^2G$, the unreacted gaseous monomer was purged and the polymerization mixture was cooled to room temperature. The thus obtained polymerization mixture in the form of an aqueous emulsion of the copolymeric resin was processed in the same manner as in Example 1 to give 1142 g of the copolymeric resin in the form of a powder. Analysis of this copolymeric resin indicated that the resin was composed of 75.1% of the vinyl chloride units, 10.9% of the vinyl acetate units, 9.7% of the vinyl caprate units, 3.2% of the allyl glycidyl ether units and 1.1% of the sodium methallyl sulfonate units. The copolymeric resin had an average degree of polymerization of 320.

Thereafter, 500 g of the copolymeric resin were taken in a reaction vessel equipped with a reflux condenser together with 700 g of methyl alcohol, 300 g of benzene and 17.5 g of sodium hydroxide and the mixture was heated at 50° C. for 5 hours to effect saponification of the copolymeric resin. After cooling to room temperature, 30 g of acetic acid were added to the mixture to neutralize the unreacted sodium hydroxide. The copolymeric resin in the reaction mixture was first washed four times each with 1000 g of methyl alcohol and then washed twice each with 1000 g of deionized water by decantation followed by filtration and drying to give 432 g of a saponified copolymeric resin, which is referred to as Polymer II hereinbelow, having an average degree of polymeriza-tion of 320. Analysis of this Polymer II indicated that the resin was composed of 79.3% of the vinyl chloride units, 5.9% of the vinyl al-cohol units, 10.2% of the vinyl caprate units, 3.4% of the allyl glycidyl ether units and 1.2% of the sodium methallyl sulfonate units.

EXAMPLE 3

The procedure of the copolymerization reaction was substantially the same as in Example 1 except that the formulation of the comonomers introduced into the autoclave was modified to be composed of 1002 g of vinyl chloride, 121 g of vinyl acetate, 87 g of vinyl laurate, 54 g of glycidyl methacrylate and 81 g of sodium sulfoethyl methacrylate to give 1060 g of a copolymeric resin having an average degree of polymerization of 380. Analysis of this copolymeric resin indicated that the resin was composed of 85.0% of the vinyl chloride units, 7.6% of the vinyl acetate units, 3.3% of the vinyl laurate units, 2.0% of the glycidyl methacrylate units and 2.1% of the sodium sulfoethyl methacrylate units.

The saponification reaction of 500 g of this copolymeric resin undertaken in the same manner as in the preceding examples gave 315 g of a powdery saponified copolymeric resin, which is referred to as the Polymer III hereinbelow, having an average degree of polymerization of 380. Analysis of this Polymer III indicated that the resin was composed of 88.1% of the vinyl chloride units, 3.9% of the vinyl alcohol units, 0.3% of the vinyl acetate units, 3.4% of the vinyl laurate units, 2.1% of the glycidyl methacrylate units and 2.2% of the sodium sulfoethyl methacrylate units.

EXAMPLE 4

Into an autoclave equipped with a stirrer, after flushing with nitrogen gas, were introduced 1020 g of vinyl chloride, 172 g of vinyl acetate, 52 g of a vinyl ester of Versatic Acid (Veova #10, a tradename by Shell Chemical Co.), 33 g of allyl glycidyl ether, 20 g of sodium sulfoethyl methacrylate, 2400 g of methyl alcohol, 4 g of a partially saponified polyvinyl alcohol having an average degree of polymerization of 600 and a degree of saponification of about 40% and 12 g of di(2-ethylhexyl)peroxy dicarbonate to form a polymerization mixture which was heated up to a temperature of 40° C. under agitation to start the copolymerization reaction. After 9 hours of continued agitation at the same temperature when the inside pressure of the autoclave had dropped to 0.2 kg/cm$^2$G, the unreacted gaseous monomer was purged and the polymerization mixture was cooled to room temperature. The thus obtained polymerization mixture in the form of a slurry was filtered to collect the particles of the copolymeric resin which was washed three times each with 3500 g of deionized water followed by drying to give 805 g of the copolymeric resin in the form of a powder. Analysis of this copolymeric resin indicated that the resin was composed of 88.6% of the vinyl chloride units, 7.9% of the vinyl acetate units, 3.3% of the Veova #10 units, 1.7% of the allyl glycidyl ether units and 0.5% of the sodium sulfoethyl methacrylate units. The copolymeric resin had an average degree of polymerization of 290.

The saponification reaction of 500 g of this copolymeric resin was performed in substantially the same manner as in Example 2 to give 335 g of a powdery saponified copolymeric resin, which is referred to as the Polymer IV hereinbelow, having an average degree of polymerization of 290. Analysis of this Polymer IV indicated that the resin was composed of 90.1% of the vinyl chloride units, 4.2% of the vinyl alcohol units, 3.4% of the Veova #10 units, 1.8% of the allyl glycidyl ether units and 0.5% of the sodium sulfoethyl methacrylate units.

COMPARATIVE EXAMPLE 1

Into an autoclave equipped with a stirrer, after flushing with nitrogen gas, were introduced 620 g of vinyl chloride, 242 g of vinyl acetate, 62 g of allyl glycidyl ether, 50 g of a 30% aqueous solution of sodium vinyl sulfonate, 2000 g of deionized water, 30 g of sodium lauryl sulfate (Emal O, supra), 55 g of polyoxyethylene octylphenyl ether (Octapol #400, supra), 24 g of trichloroethylene, 6 g of sodium carbonate and 28 g of potassium persulfate to form a polymerization mixture which was heated up to a temperature of 60° C. under agitation to start the copolymerization reaction. During proceeding of the copolymerization reaction, 620 g of vinyl chloride monomer were further introduced continuously into the autoclave under pressurization taking 8 hours.

When the inside pressure of the autoclave had dropped to 0.5 kg/cm$^2$G, the unreacted gaseous monomer was purged and the polymerization mixture was cooled to room temperature. The thus obtained polymerization mixture in the form of an aqueous emulsion taken out of the autoclave was admixed with 3500 g of methyl alcohol and further agitated for 1 hour at 60° C. followed by cooling to room temperature. The copolymerizate slurry was filtered to collect the particles of the copolymeric resin which were washed three times each with 3500 g of deionized water followed by drying to give 1360 g of the copolymeric resin in the form of a powder. Analysis of this copolymeric resin indicated that the resin was composed of 82.2% of the vinyl chloride units, 14.7% of the vinyl acetate units, 2.8% of the allyl glycidyl ether units and 0.3% of the sodium vinyl sulfonate units. The copolymeric resin had an average degree of polymerization of 310.

The saponification reaction of 500 g of the thus obtained copolymeric resin was performed in substantially the same manner as in Example 1 to give 460 g of a powdery saponified copolymeric resin, which is referred to as the Polymer V hereinbelow, having an average degree of polymerization of 310. Analysis of this Polymer V indicated that the resin was composed of 87.0% of the vinyl chloride units, 6.2% of the vinyl alcohol units, 3.5% of the vinyl acetate units, 3.0% of the allyl glycidyl ether units and 0.3% of the sodium vinyl sulfonate units.

COMPARATIVE EXAMPLE 2

The procedure of the copolymerization reaction was substantially the same as in Example 1 except that the formulation of the comonomers introduced into the autoclave was modified to be composed of 1055 g of vinyl chloride, 287 g of vinyl acetate, 136 g of Veova #10 and 32 g of sodium methallyl sulfonate to give 1280 g of a copolymeric resin having an average degree of polymerization of 450. Analysis of this copolymeric resin indicated that the resin was composed of 74.2% of the vinyl chloride units, 17.2% of the vinyl acetate units, 8.0% of the Veova #10 units and 0.6% of the sodium methallyl sulfonate units.

The saponification reaction of 500 g of the thus obtained copolymeric resin was performed in substantially the same manner as in Example 1 to give 455 g of a powdery saponified copolymeric resin, which is referred to as the Polymer VI hereinbelow, having an average degree of polymerization of 450. Analysis of this Polymer VI indicated that the resin was composed of 80.5% of the vinyl chloride units, 8.9% of the vinyl alcohol units, 1.2% of the vinyl acetate units, 8.7% of the Veova #10 units and 0.7% of the sodium methallyl sulfonate units.

EXAMPLES 7 TO 10 AND COMPARATIVE EXAMPLES 3 AND 4

Magnetic coating compositions were prepared each by blending 18 parts of one of the Polymers I to VI prepared above, 100 parts of a powder of cobalt-doped iron oxide $\gamma$-$Fe_2O_3$ having a specific surface area of 45 $m^2/g$ as determined by the BET method, 7 parts of a polyurethane resin (N-2304, a product by Nippon Polyurethane Kogyo Co.), 5 parts of a carbon black as an antistatic agent, 2 parts of lecithin, each 75 parts of methyl ethyl ketone, cyclohexanone and toluene and 5 parts of a polyisocyanate compound (Coronate L, supra) and grinding the mixture in a sand grinder for 4 hours to uniformly dissolve or disperse the respective ingredients in the solvent mixture. The thus prepared magnetic coating compositions had a viscosity in centipoise shown in the table given below as determined by using a rotational viscosimeter (Model EMD, manufactured by Tokyo Keiki Co.).

A polyester film having a thickness of 15 μm was coated with the magnetic coating composition in a thickness of about 6 μm as dried and subjected to a magnetic orientation treatment in a magnetic field of 2200 G using repulsive magnets followed by drying. The thus coated film was subjected to calendering to have an increased smoothness of the surface and then slitted into tapes of ½ inch width which were subjected to the evaluation tests for the respective items given below.

(1) The surface gloss of the tapes was evaluated by measuring the reflectivity at an angle of 60° by using a glossmeter making reference to a standard test panels specified in JIS Z 8741 and ASTM-0523-67.

(2) The coercive force $H_c$, residual density of magnetic flux $B_r$ and squareness of the hysteresis loop of the tapes were measured by using a vibrated-sample magnetometer (model BHV-55, manufactured by Riken Electronics Co.

(3) The durability of the tapes was evaluated by rubbing the tape 1000 times with a rubbing head of 100 g weight covered with a sheet of silicone paper using a Gakushin-type wearing tester according to the procedure specified in JIS L 0823 and visually examining the condition of particle falling on the surface of the tape to give the results in four ratings of A, B, C and D in an increasing order of the particle falling, A being for absolute absence of particle falling.

It is understood from the results shown in the table below that the magnetic coating composition according to the invention is superior to the conventional ones in respect of the dispersibility and impregnation behavior of the ferromagnetic particlses along with good compatibility between the resinous ingredients to give a lower viscosity of the coating composition. Further, the magnetic recording tapes according to the invention are superior to those prepared by using conventional magnetic coating compositions not only in the magnetic properties but also in the surface gloss and durability.

TABLE

| | Polymer No. | | | | | |
|---|---|---|---|---|---|---|
| | I | II | III | IV | V | VI |
| Viscosity of coating composition, cps | 3000 | 2800 | 4300 | 5000 | 12000 | 15000 |
| Surface gloss, % | 119 | 120 | 114 | 113 | 77 | 99 |
| Magnetic properties | | | | | | |
| $H_c$, Oe | 750 | 710 | 700 | 720 | 660 | 690 |
| $B_r$, G | 1710 | 1730 | 1640 | 1820 | 1430 | 1520 |
| Squareness | 0.82 | 0.82 | 0.81 | 0.82 | 0.72 | 0.79 |
| Durability | A | A | A | A | C-D | C |

What is claimed is:

1. A magnetic coating composition which comprises, in admixture:

(A) a vinyl chloride-based copolymeric resin, having an average degree of polymerization in the range from 200 to 800, as a resinous vehicle, and (B) ferromagnetic particles having a specific surface area of at least 35 $m^2/g$ as determined by the BET method dispersed in the vehicle of the copolymeric resin, the copolymeric resin being composed of (a) a moiety of vinyl chloride, (b) a moiety of vinyl alcohol, (c) a moiety of a vinyl carboxylate having from 6 to 20 carbon atoms in a unit, (d) a moiety of a vinyl or allyl monomer having a sulfonic acid group or a sulfonic acid group in the form of a metal salt in the molecule, and (e) a moiety of a vinyl or allyl monomer having an epoxy group in the molecule.

2. The magnetic coating composition as claimed in claim 1 wherein the amount of the copolymeric resin as the component (A) is in the range from 8 to 30 parts by weight per 100 parts by weight of the ferromagnetic particles.

3. The magnetic coating composition as claimed in claim 1 wherein the copolymeric resin as the component (A) is composed of from 60 to 92% by weight of the moiety (a), from 3 to 15% by weight of the moiety (b), from 3 to 25% by weight of the moiety (c), from 0.5 to 3% by weight of the moiety (d) and from 1 to 10% by weight of the moiety (e).

4. The magnetic coating composition as claimed in claim 1 which further comprises a polyisocyanate compound in an amount not exceeding 40 parts by weight per 100 parts by weight of the copolymeric resin as the component (A).

5. The magnetic coating composition as claimed in claim 1 wherein the ferromagnetic particles have a specific surface area in the range from 45 to 55 $m^2/g$ as determined by the BET method.

6. A magnetic recording medium which comprises: a substrate; and a magnetic coating layer, formed on at least one surface of the substrate, of a magnetic coating composition comprising (A) a vinyl chloride-based copolymeric resin, having an average degree of polymerization in the range from 200 to 800, as a resinous vehicle, and (B) ferromagnetic particles having a specific surface area of at least 35 $m^2/g$ as determined by the BET method dispersed in the vehicle of the copolymeric resin, the copolymeric resin being composed of (a) a moiety of vinyl chloride, (b) a moiety of vinyl alcohol, (c) a moiety of a vinyl carboxylate having from 6 to 20 carbon atoms in a unit, (d) a moiety of a vinyl or allyl monomer having a sulfonic acid group or a sulfonic acid group in the form of a metal salt in the molecule, and (e) a moiety of a vinyl or allyl monomer having an epoxy group in the molecule.

7. The magnetic recording medium as claimed in claim 6 wherein the amount of the copolymeric resin as the component (A) is in the range from 8 to 30 parts by weight per 100 parts by weight of the ferromagnetic particles.

8. The magnetic recording medium as claimed in claim 6 wherein the copolymeric resin as the component (A) is composed of from 60 to 92% by weight of the moiety (a), from 3 to 15% by weight of the moiety (b), from 3 to 25% by weight of the moiety (c), from 0.5 to 3% by weight of the moiety (d) and from 1 to 10% by weight of the moiety (e).

9. The magnetic recording medium as claimed in claim 6 wherein the magnetic coating composition further comprises a polyisocyanate compound in an amount not exceeding 40 parts by weight per 100 parts by weight of the copolymeric resin as the component (A).

10. The magnetic recording medium as claimed in claim 6 wherein the ferromagnetic particles have a specific surface area in the range from 45 to 55 $m^2/g$ as determined by the BET method.

* * * * *